(12) United States Patent
Schwarz et al.

(10) Patent No.: US 7,101,137 B2
(45) Date of Patent: Sep. 5, 2006

(54) LOADING MEANS FOR WORKPIECES

(75) Inventors: Eberhard Schwarz, Nagold (DE); Manfred Berger, Weinsberg (DE)

(73) Assignee: Cross Hüller GmbH, (DE)

( * ) Notice: Subject to any disclaimer, the term of this patent is extended or adjusted under 35 U.S.C. 154(b) by 140 days.

(21) Appl. No.: 10/839,416

(22) Filed: May 4, 2004

(65) Prior Publication Data
US 2004/0234363 A1    Nov. 25, 2004

(30) Foreign Application Priority Data
May 21, 2003    (EP) .................................. 03011503

(51) Int. Cl.
*B65H 5/00* (2006.01)
(52) U.S. Cl. ................ 414/222.01; 198/468.6
(58) Field of Classification Search ........... 414/222.01; 198/346.3, 468.6
See application file for complete search history.

(56) References Cited

FOREIGN PATENT DOCUMENTS

| DE | 32 12 272 | 10/1983 |
|---|---|---|
| DE | 196 42 042 A1 | 4/1998 |
| EP | 0 852 988 | 7/1998 |
| GB | 1 456 385 | 11/1976 |

*Primary Examiner*—Donald Underwood
(74) *Attorney, Agent, or Firm*—McGlew & Tuttle P.C.

(57) ABSTRACT

A loading device for transporting workpieces (3) from a readiness position, preferably a workpiece transport means, to a machining unit (1) and vice versa, or between machining units, is provided with a loading portal arranged above the machining site, on which linear robots (5, 6), bent-arm robots or similar means are arranged displaceably for transporting and releasing or picking up the workpieces (3) at or from the machining unit (1). One or more tray-like catching means (7) arranged under the workpieces (3) are also arranged displaceably at the loading portal (4, 10) with the displaceable means (5, 6).

13 Claims, 4 Drawing Sheets

LOADING MEANS FOR WORKPIECES

CROSS REFERENCE TO RELATED APPLICATIONS

This application claims the benefit of priority under 35 U.S.C. § 119 of European patent application EP 03 011 503.4 filed May 21, 2003 the entire contents of which are incorporated herein by reference.

FIELD OF THE INVENTION

The present invention pertains to a loading means for transporting workpieces from a readiness position, preferably with a workpiece transport means, to a machining unit and vice versa, or between the machining units, and with a loading portal above the machining site, on which loading portal linear robots, bent-arm robots or similar means are arranged displaceably for transporting and releasing or picking up the workpieces at or from the machining unit.

BACKGROUND OF THE INVENTION

A loading means for a machining unit to be loaded from a position in which the workpiece is in a readiness position is known from DE 196 42 042 A1, wherein a loading carriage with a pivoting arm and a workpiece gripper is displaceable for transporting the workpiece on an elevated guide path above the machining unit. In production systems with such loading means arranged above the machine tools, it belongs to the state of the art to stationarily arrange plates, especially plate trays that both offer protection against the lowering of the loader in case of error and catch cooling lubricants dripping from the workpieces and chips between the machines, especially between the readiness place and the machining area. The cost of such constructions is relatively high because of the frequently great distances.

SUMMARY OF THE INVENTION

The basic object of the present invention is therefore to provide a loading means of this type with simple, efficient and inexpensive catching means.

According to the invention, a loading means is provided for transporting workpieces from a readiness position, preferably with a workpiece transport means, to a machining unit and vice versa, or between the machining units. A loading portal is provided above the machining site, on which loading portal linear robots, bent-arm robots or similar means are arranged displaceably for transporting and releasing or picking up the workpieces at or from the machining unit. It is provided according to the present invention that one or more tray-like catching means arranged under the workpieces also be arranged displaceably with the displaceable means at the leading portal.

Contrary to the stationary plate trays belonging to the state of the art, the catching means according to the present invention are each likewise displaceable simultaneously with the workpieces at the travel rails of the loading portal, so that they are always arranged under the workpieces during the transportation of the workpieces to the machine tools and they catch dripping cooling lubricants and falling chips. The workpieces can then be deposited on the machining table or the workpiece conveyor belt or picked up from same above the machining site at the machining unit and optionally also above the readiness position by means of a linear robot, a bent-arm robot or similar means, at which a workpiece gripper is arranged, by an essentially vertical movement. If a linear robot is used, the workpiece can be lowered and picked up by a vertical movement if the catching means is displaced in relation to the linear robot into such a position that the vertical path of displacement is released. A transfer opening may be arranged for this purpose in the bottom of the catching means. The catching means may be designed according to the present invention as a workpiece storage means and also accommodate a plurality of workpieces in this case. To pick up and release the workpieces from or at a certain storage space, the catching means is linearly displaced under the raised workpiece gripper.

If a bent-arm robot is used, it proved to be favorable to pick up and then to release the workpiece from one or more workpiece storage means that are arranged laterally next to the vertical transport path and then to release them.

The control of the loading means may be designed according to the present invention such that the loader or the workpiece gripper can move on the travel rail only when the workpiece gripper is positioned above the catching means in a protective position. Consequently, when the relative movement of the catching means to the robots is prevented from occurring, the entire loading means can be moved on the travel rail of the loading portal.

The present invention will be explained in greater detail as an example on the basis of the Figures attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

The loading device or loading means is shown in two embodiments according to FIGS. 1 through 4 are each loading device is arranged at a loading portal, which can also bridge over a greater connection between the machining unit 1 and a site, not shown, for making the workpieces ready.

Figure 1:
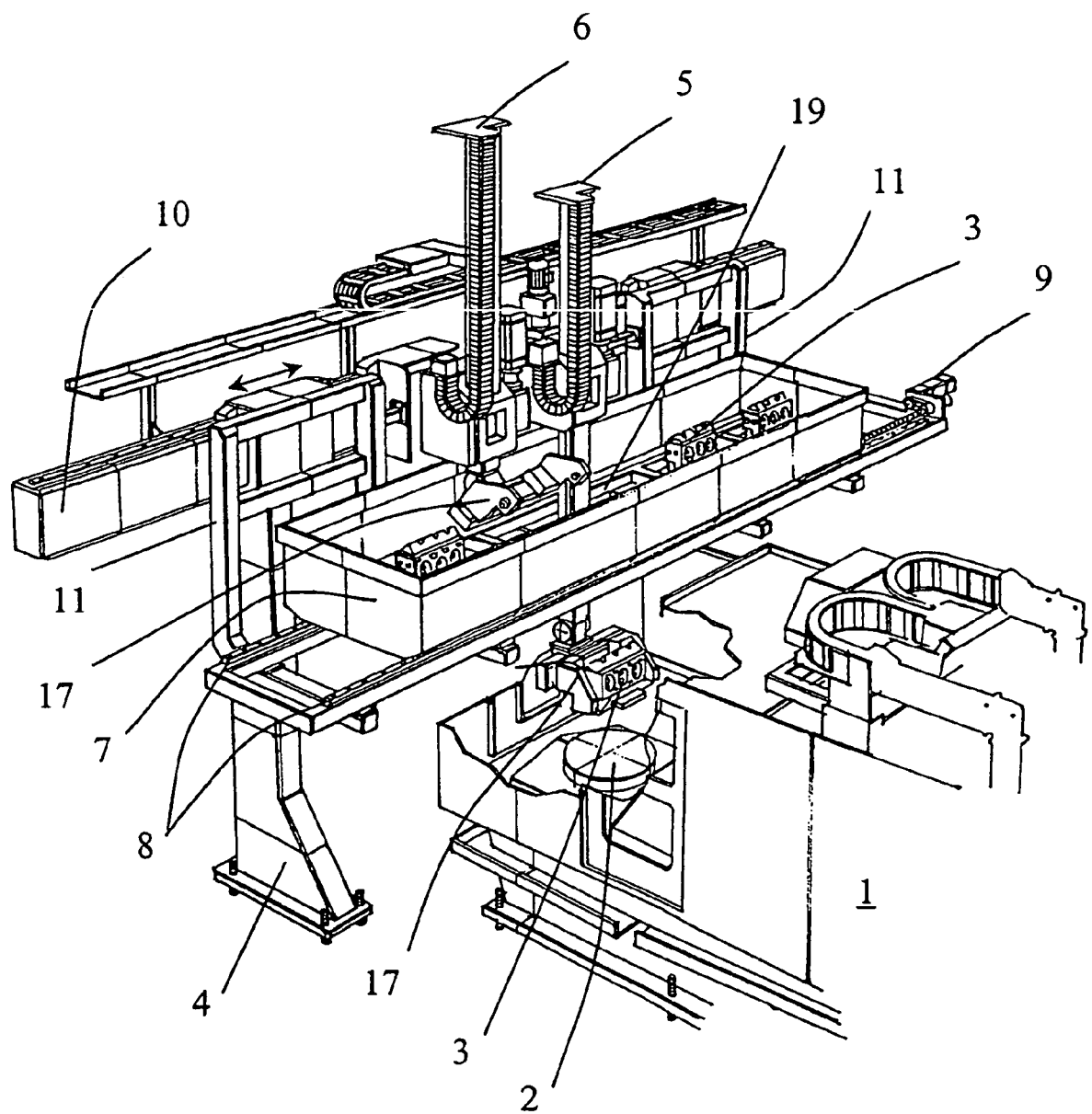
FIG. 1 is a perspective view of a loading means with two linear robots with a linear robot arranged just above a rotary table of a machining unit and showing a transfer opening arranged in a catching means with a gripper for transferring or picking up the workpiece.

In the embodiment shown in FIG. 1, the loading device has two linear robots 5, 6. The linear robot 5 is arranged just above a rotary table 2 of the machining unit 1. The linear robot 5 is provided acting through a transfer opening 19 arranged in a catching means 7 with the gripper 17 for transferring or picking up a workpiece 3.

Figure 2:
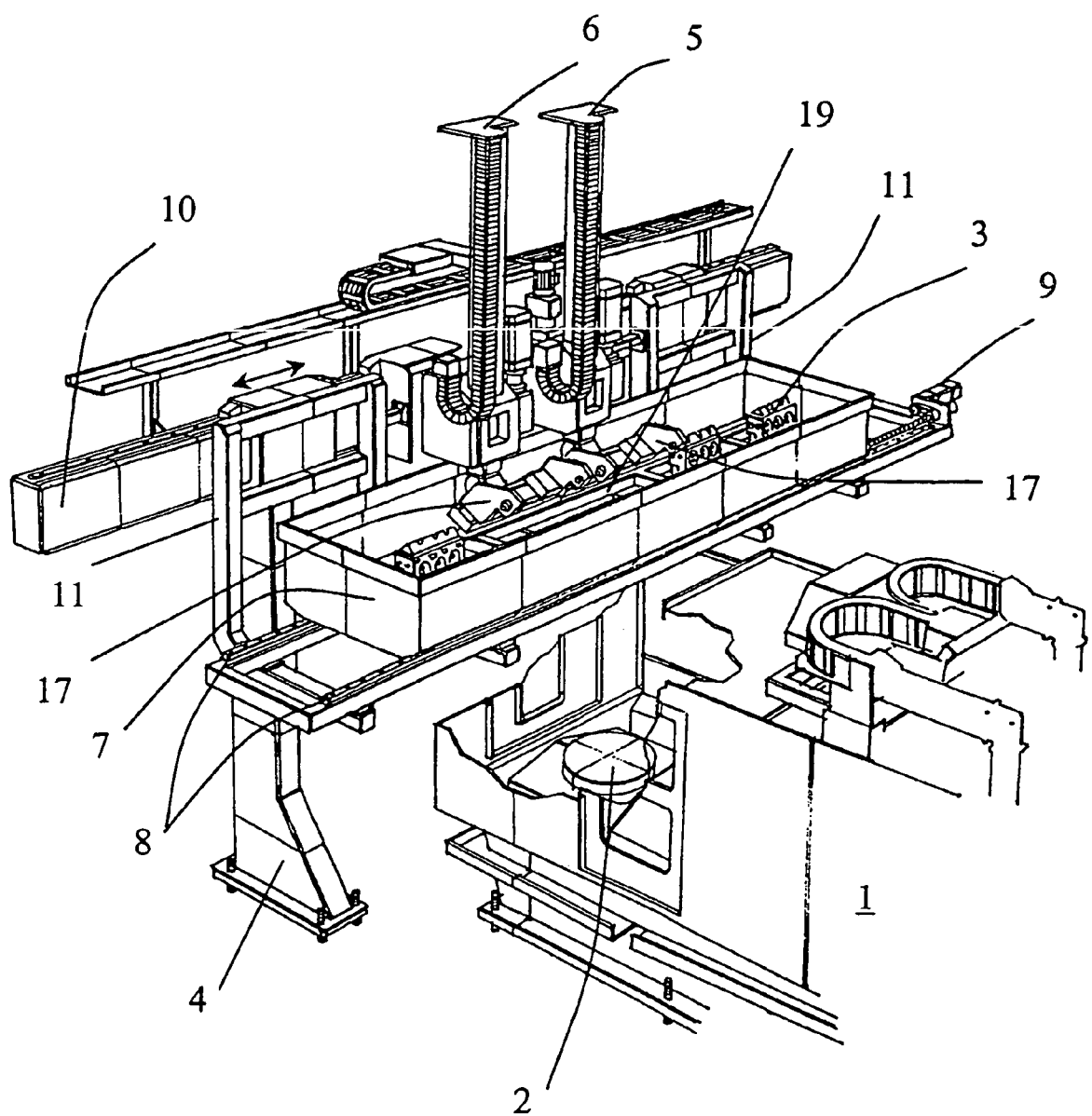
FIG. 2 is a perspective view corresponding to the arrangement according to FIG. 1, wherein both linear robots with their grippers are arranged in the upper position essentially above the transfer opening.
Figure 3:
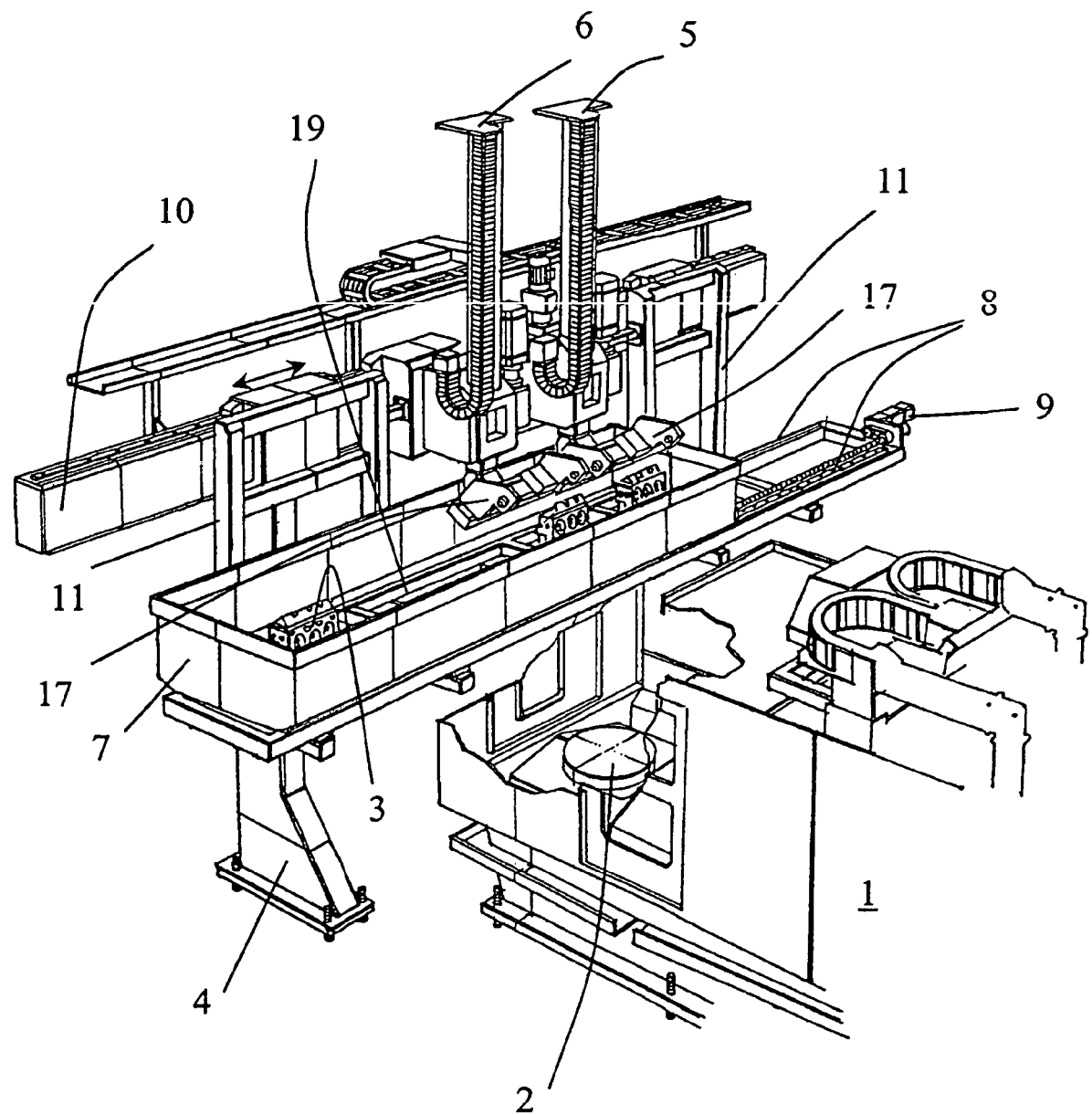
FIG. 3 is a perspective view corresponding to that in FIG. 2, wherein the two linear robots 5, 6 are arranged in the upper position above the catching means 7 next to the transfer opening 19 in the protective position.

According to the embodiment of FIGS. 1 through 3, the loading portal comprises a horizontally arranged travel rail 10, which is arranged stationarily on vertical supports 4. The two linear robots 5 and 6 are displaceable together on the travel rail 10 in the direction of the double arrow. These two linear robots 5, 6 are framed in, in the transportation direction by holding means 11. The holding means 11 are likewise displaceable only together, with each of them being supported on the travel rail 10. The travel rails 8 for the catching means 7 are located on the holding means 11. The catching means 7 can be displaced by means of the drive 9 on the travel rails 8 relative to the linear robots 5, 6 in parallel to the travel rail 10.

FIG. 2 shows the embodiment according to FIG. 1 in a different state. Both linear robots 5 and 6 with their grippers 17 are arranged in the upper position essentially above the transfer opening 19. FIG. 3 shows the embodiment according to FIG. 1 with the two linear robots 5, 6 are arranged in the upper position above the catching means 7 next to the transfer opening 19 in the protective position. In FIG. 3, the catching means 7 has been repositioned.

The catching means 7 can be positioned by means of a simple control relative to the linear robots 5, 6 with the workpiece grippers 17 fastened thereto in the position shown in FIG. 3 for protection against the unintended lowering of the linear robots 5, 6, or for protection against workpieces 3 falling down from the workpiece gripper 17. All the means 3 through 7, 11 and 17 are displaced only together on the travel rail 10 in the direction of the double arrow.

Figure 4:
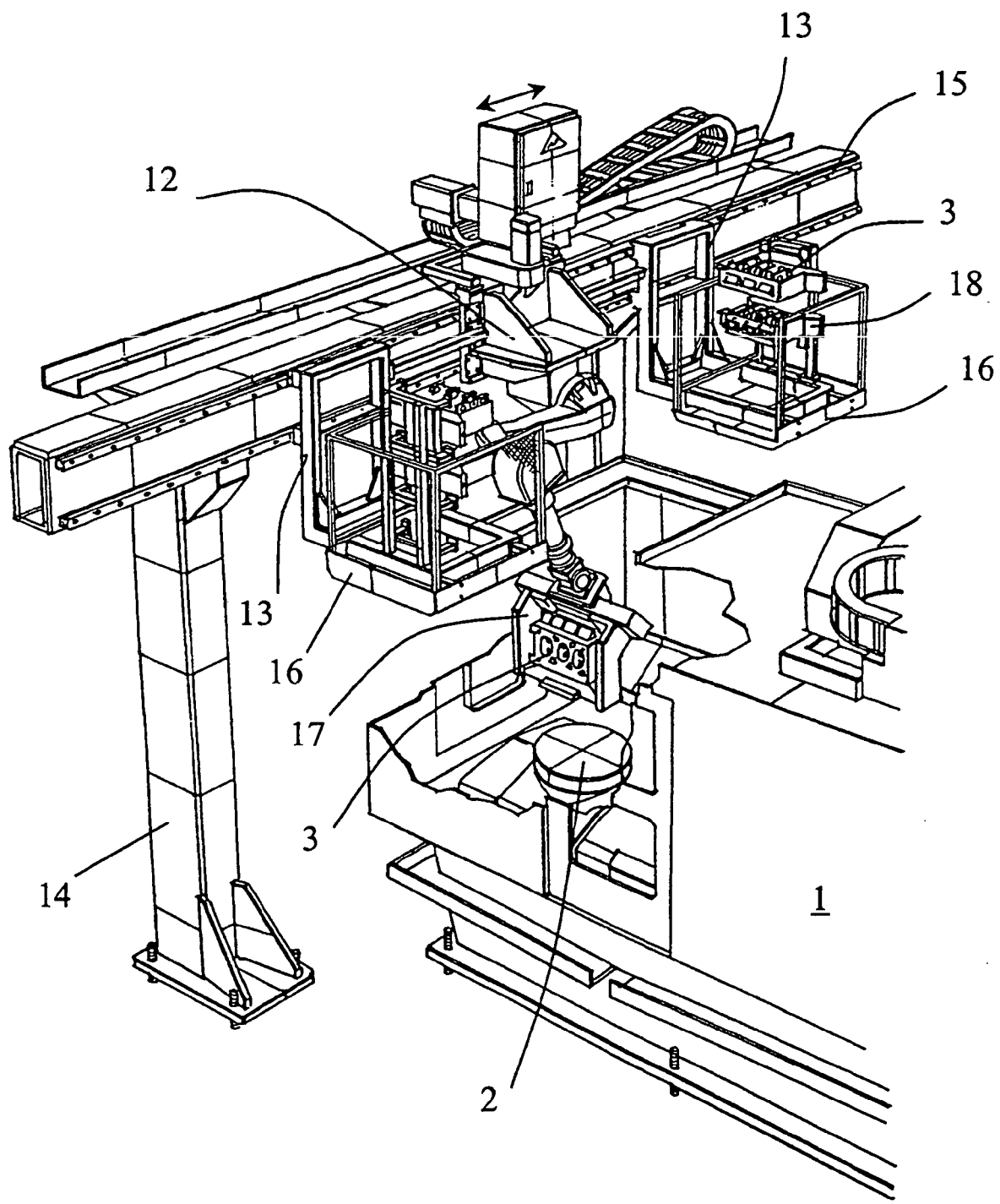
FIG. 4 is a perspective view of a loading means of a second embodiment with a bent-arm robot.

In FIG. 4, the bent-arm robot 12 is displaceable on the travel rail 15, which is mounted stationarily on the supports 14, together with the holding means 13 in the direction of the double arrow. In this embodiment, an alternative catching means 16 is employed. The catching means 16 has one or more workpiece storage means 18. The catching means 16 together with a plurality of workpiece storage means 18 positioned on them are arranged at the holding means 13 in front of and behind the bent-arm robot 12 in the direction of displacement. The bent-arm robot 12 with the workpiece gripper 17 fastened movably on it and the workpiece 3 being held by the workpiece gripper is shown in the view in FIG. 4 in the position just above the rotary table 2 of the machining unit 1. For the movement on the travel rail 15 into a protective position, not shown, the bent-arm robot 12 with the workpiece gripper 17 is positioned on one of the two catching means 16.

While a specific embodiment of the invention has been shown and described in detail to illustrate the application of the principles of the invention, it will be understood that the invention may be embodied otherwise without departing from such principles.

APPENDIX

List of Reference Numbers

1 Machining unit
2 Rotary table
3 Workpiece
4 Support
5 Linear robot (displaceable at 10)
6 Linear robot (displaceable at 10)
7 Catching means (displaceable on 8)
8 Travel rail (for 7)
9 Drive (for 7)
10 Travel rail (stationary at 4; for 5, 6 and 11)
11 Holding means (for 8)
12 Bent-arm robot (displaceable on 15)
13 Holding means (for 16, 18; displaceable on 15)
14 Support
15 Travel rail (at 14; for 12, 13)
16 Catching means (at 13)
17 Workpiece gripper (at 5, 6 and 12)
18 Workpiece storage means (on 16)
19 Transfer opening (in 7)

What is claimed is:

1. A loading device for transporting workpieces from a readiness position to a machining unit and vice versa, or between machining units, all at a machining site the device comprising:
   a loading portal mountable above the machining site;
   a displaceable robot comprising one or more of a linear robot or a bent-arm robot, said displaceable robot being arranged displaceably on said loading portal for transporting and releasing or picking up the workpieces at or from the machining unit; and
   tray-like catching means arranged under the workpieces and also arranged displaceably with said displaceable robot on the loading portal.

2. A loading device in accordance with claim 1, further comprising a workpiece storage means for storing workpieces used for picking up one or more workpieces, said workpiece storage means being arranged on said catching means.

3. A loading device in accordance with claim 1, wherein a transfer opening for the workpieces is arranged in the catching means.

4. A loading device in accordance with claim 1, wherein the catching means is mounted to be displaceable relative to the displaceable robot.

5. A loading device in accordance with claim 4, further comprising: a catching means travel rail, a travel rail including said loading portal and a holding means, wherein said catching means is mounted to be displaceable on said catching means travel rail and said catching means travel rail is arranged in parallel to said travel rail, wherein said catching means travel rail is fastened to said holding means, said holding means being in turn displaceable on said travel rail.

6. A loading device in accordance with claim 1, further comprising workpiece grippers arranged at the displaceable robot, said workpiece grippers being positioned in a protective position above the catching means during the displacement of said robot.

7. A loading device, comprising:
   a machining site including a plurality of machining units;
   a loading portal above the machining site;
   a workpiece transport means for transporting workpieces from a readiness position to one of said machining units and vice versa, or between two of said machining units, said transport means being arranged displaceably on said loading portal for transporting and releasing or picking up the workpieces at or from the machining units; and
   a catching means arranged under the workpieces and also arranged displaceably on said loading portal.

8. A loading device in accordance with claim 7, further comprising a workpiece storage means for storing workpieces used for picking up one or more workpieces, said workpiece storage means being arranged on said catching means.

9. A loading device in accordance with claim 7, wherein a transfer opening for the workpieces is arranged in the catching means.

10. A loading device in accordance with claim 7, wherein the catching means is mounted to be displaceable relative to the transport means.

11. A loading device in accordance with claim 10, further comprising: a catching means travel rail, a travel rail including said loading portal and a holding means, wherein said catching means is mounted to be displaceable on said catching means travel rail and said catching means travel rail is arranged in parallel to said travel rail, wherein said catching means travel rail is fastened to said holding means, said holding means being in turn displaceable on said travel rail.

12. A loading device in accordance with claim 7, further comprising workpiece grippers arranged at the workpiece transport means said workpiece grippers being positioned in a protective position above said catching means during the displacement of said workpiece transport means.

13. A loading device in accordance with claim 7, wherein said workpiece transport means comprises one or more of a linear robot or a bent-arm robot.

* * * * *